(12) United States Patent
Shiraishi

(10) Patent No.: US 8,045,035 B2
(45) Date of Patent: Oct. 25, 2011

(54) IMAGING APPARATUS, IMAGING CONTROL METHOD AND RECORDING MEDIUM READABLE BY COMPUTER

(75) Inventor: Kenji Shiraishi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 904 days.

(21) Appl. No.: 11/993,305

(22) PCT Filed: Jun. 21, 2006

(86) PCT No.: PCT/JP2006/312838
§ 371 (c)(1),
(2), (4) Date: Dec. 20, 2007

(87) PCT Pub. No.: WO2006/137567
PCT Pub. Date: Dec. 28, 2006

(65) Prior Publication Data
US 2010/0157077 A1    Jun. 24, 2010

(30) Foreign Application Priority Data
Jun. 21, 2005  (JP) .................................. 2005-180519

(51) Int. Cl.
*H04N 5/335* (2011.01)
*H04N 3/14* (2006.01)

(52) U.S. Cl. ......... 348/312; 348/294; 348/311; 348/295

(58) Field of Classification Search .................. None
See application file for complete search history.

(56) References Cited

U.S. PATENT DOCUMENTS

| | | | |
|---|---|---|---|
| 4,598,322 A | | 7/1986 | Atherton |
| 5,124,796 A | * | 6/1992 | Maki .............................. 348/312 |
| 5,206,730 A | * | 4/1993 | Sakai ........................ 348/220.1 |
| 5,541,645 A | * | 7/1996 | Davis .............................. 348/96 |
| 6,407,512 B1 | | 6/2002 | Yoshida et al. |
| 6,870,566 B1 | * | 3/2005 | Koide et al. .................... 348/296 |
| 2001/0022523 A1 | * | 9/2001 | Takami ......................... 327/156 |
| 2003/0071908 A1 | | 4/2003 | Sannoh et al. |
| 2003/0107664 A1 | * | 6/2003 | Suzuki .......................... 348/296 |

(Continued)

FOREIGN PATENT DOCUMENTS

CN    1314611 A    9/2001

(Continued)

OTHER PUBLICATIONS

Japanese Office Action issued Dec. 7, 2010, in Patent Application No. 2005-180519.

(Continued)

*Primary Examiner* — David Ometz
*Assistant Examiner* — Dwight C Tejano
(74) *Attorney, Agent, or Firm* — Oblon, Spivak, McClelland, Maier & Neustadt, L.L.P.

(57) ABSTRACT

A timing signals generator, a frequency divider, an oscillator, and a signals processing IC generates driving signals and transfer signals of a CCD. When the CCD is exposed through a long time exposure in which exposure is performed for not less than a predetermined time, each of a clock frequency of driving signals during an exposure period and a clock frequency of each of driving signals and transferring signals during a transferring period is adjusted to be lower than a clock frequency of thereof in an exposure state in which exposure is performed for less than the predetermined time period.

14 Claims, 11 Drawing Sheets

U.S. PATENT DOCUMENTS

| | | |
|---|---|---|
| 2003/0146988 A1 | 8/2003 | Shiraishi |
| 2003/0147000 A1 | 8/2003 | Shiraishi |
| 2003/0169346 A1 | 9/2003 | Ojima et al. |
| 2004/0130632 A1 | 7/2004 | Shiraishi |
| 2004/0252224 A1 | 12/2004 | Shiraishi et al. |
| 2004/0263633 A1 | 12/2004 | Shinohara et al. |
| 2005/0062854 A1 | 3/2005 | Shiraishi |
| 2005/0134700 A1 | 6/2005 | Shiraishi |
| 2005/0151874 A1 | 7/2005 | Shiraishi |
| 2005/0168620 A1 | 8/2005 | Shiraishi |
| 2006/0132652 A1* | 6/2006 | Kim .................... 348/524 |
| 2006/0158554 A1* | 7/2006 | Cho .................... 348/537 |
| 2007/0076116 A1* | 4/2007 | Pandit et al. ......... 348/364 |

FOREIGN PATENT DOCUMENTS

| | | |
|---|---|---|
| EP | 0 695 081 A2 | 1/1996 |
| EP | 0 777 381 A2 | 6/1997 |
| JP | 64-86768 | 3/1989 |
| JP | 3-154487 | 7/1991 |
| JP | 9-163238 | 6/1997 |
| JP | 9-205518 | 8/1997 |
| JP | 10-304250 | 11/1998 |
| JP | 2000-32332 | 1/2000 |
| JP | 2001-54019 | 2/2001 |
| JP | 3162206 | 2/2001 |
| JP | 2001-326853 | 11/2001 |
| JP | 2002-300466 | 10/2002 |
| JP | 3376193 | 11/2002 |
| JP | 2003-60994 | 2/2003 |
| JP | 2004-228606 | 8/2004 |
| JP | 2004-235691 | 8/2004 |
| JP | 2005-37765 | 2/2005 |
| NL | 8 700 772 A | 11/1988 |

OTHER PUBLICATIONS

Supplementary European Search Report mailed on Jul. 18, 2011, issued for EP Application No. EP 06 76 7455 (with English Translation).

* cited by examiner

IMAGING APPARATUS, IMAGING CONTROL METHOD AND RECORDING MEDIUM READABLE BY COMPUTER

CROSS-REFERENCE TO RELATED APPLICATION

The entire contents of Japanese patent application No. 2005-180519, filed on Jun. 21, 2005 of which the convention priority is claimed in this application are incorporated thereinto by reference.

TECHNICAL FIELD

The present invention relates to an imaging apparatus, an imaging control method and a recording medium readable by a computer. Especially it relates to modifications about exposure control or transferring control for imaging device so-called CCD and CMOS, etc.

BACKGROUND ART

Imaging apparatus as so-called digital still camera and digital video camera, etc., each comprises an imaging device such as CCD or CMOS that can take out projected images as signals, nearly at real times.

In the case that a camera having this kind of the imaging device is employed to photograph stars, etc. at night, it is necessary to perform exposure for a quite long time such as more than 3 minutes.

However, signals driving CCD or the like or a peripheral circuit thereof which may affect charges accumulated in CCD or the like, during exposure period are accumulated as noise, for example.

Here, even a noise which does not matter in the normal photographing for a short exposure time period may be a noise that can not be neglected in reproduction images, in the case that the exposure time period is a long time period as mentioned above, because the noise is also accumulated for a long time.

FIG. 4 is a readout model of frame transfer mode in which readout of a still image recorded in CCD is transferred with 3 fields separately. FIG. 5 is a readout model in monitoring driving mode. And a CCD driving mode at a still image exposure is the monitoring driving mode.

In the case of a long time exposure, accumulation in each pixel is performed corresponding to the exposure time period. After a predetermined accumulating (exposure) time period is elapsed, a mechanical shutter disposed at an optical system or between the optical system and the CCD is closed to attain a shielding state, and readout operation shown in FIG. 4 is performed.

During a time period before the predetermined exposure time period elapsed (i.e. the exposure operation time period), signals are not output from each pixel of CCD through horizontal and vertical transferring paths. However, since CCD is continued to be operated by 1/30 cycle of the monitoring driving mode, for example if a low-level noise occurs due to the driving signals of the monitoring driving mode, even it is a minor signal which would not result any problem in the normal monitoring, in case that CCD is exposed for 1 second, noise will be accumulated for 30 times, so that the level of the noise signal becomes greater, and causes periodically horizontal-striped patterns with high brightness in the image, and becomes to be extremely observable noise.

Moreover, since in CCD or the like, unforeseen noise is caused by dark-current, and there are variations in light receiving sensitivity among a number of light receiving elements which construct CCD or the like exist, even an exposure is performed by the same light and for the same time period, the differences among signal levels output from each light receiving elements occur.

Furthermore, generation of dark-currents and variations of sensitivity are especially affected by temperature, and the differences mentioned above become greater as the temperature rises.

As shown in FIG. 5, an amplifier disposed at the output end of the CCD horizontal transfer line is operated by driving clocks for CCD. If it keeps working, heat generates certainly, which increases the dark currents of elements adjacent to the amplifier due to the affection of the generated heat, and the differences in the signal levels between them and elements at other portions also become greater, while by lowering a clock frequency at exposure and reducing the number of times of operation, the generation of heat is suppressed and the generation of noise is also inhibited. (Refer to JP-A 3162206 and JP-A 3376193).

Furthermore, techniques of modifying the operation clock of CCD, corresponding to a readout mode of signals data from CCD are proposed. (Refer to JP-A 2003-060994 and JP-A H10-304250).

Moreover, a technology of controlling an exposure time period according to brightness of a subject and controlling the clock of transferring time period to be proportional to the exposure time period is also proposed. (Refer to JP-A 2001-054019).

However, as for recent digital cameras, volume of data that should be read out increased with increase in the number of image pickup devices (higher pixel counts), and at the same time improvement of operation speed is required.

DISCLOSURE OF THE INVENTION

Problem to be Solved by the Invention

Therefore, an object of the present invention is to provide an imaging apparatus, an imaging control method and a recording medium readable by a computer that can restrain the generation of noise, without substantively prolonging the entire operation time period.

The imaging apparatus (including camera, copier, facsimile and personal digital assistant having functions of camera), and the imaging control method according to the present invention, inhibit the generation of noise without substantively prolonging the entire time period required for the operations including the exposure operation and the transferring operation, by adjusting the clock frequency of driving signals which are triggers for converting exposed subject images to images signals, and/or the clock frequency of transferring signals for transferring the image signals obtained by conversion, in compliance with an exposure time period.

Means for Solving the Problem

In other words, an imaging apparatus according to an aspect of the present invention comprises: a color imaging device which converts an image of a subject projected through an optical system to color image signals and outputs the color image signals, an image processing unit which processes an image and saves the image, an image signal transferring unit which transfers the color image signals to the image processing unit, a timing signals generator which generates driving signals for the color imaging device, and a clock frequency adjuster, wherein when the color imaging device is exposed through a long time exposure in which exposure is performed for not less than a predetermined time period, the clock frequency adjuster adjusts a clock frequency of the driving signals during the exposure period to be lower than a clock frequency of the driving signals in an exposure state in which exposure is performed for less than the predetermined time period.

According to the imaging apparatus of the present invention with such a structure, when the color imaging device is exposed through a long time exposure in which exposure is performed for not less than the predetermined time period, the clock frequency adjuster adjusts the clock frequency of the driving signals during the exposure period to be lower than the clock frequency of the driving signals in the exposure state in which exposure is performed for less than the predetermined time period. Therefore, even when exposure is performed for a long time period, due to reduction of an operation cycle, the generation of heat by the amplifier or the like contained in the color imaging device can be suppressed, and the generation of noise can be inhibited.

On the other hand, even if the clock frequency of the driving signals of the color imaging device during the exposure period is reduced, there is absolutely no effect on the subsequent transfer, therefore the operation speed is not decreased.

An imaging apparatus according to another aspect of the present invention, comprises: a color imaging device which converts an image of a subject projected through an optical system to color image signals and outputs the color image signals, an image processing unit which processes an image and saves the image, an image signal transferring unit which transfers the color image signals to the image processing unit, a first timing signals generator which generates driving signals for driving the color imaging device; a second timing signals generator which generates transferring signals for transferring by the image signal transferring unit, and a clock frequency adjuster, wherein when the color imaging device is exposed through a long time exposure in which exposure is performed for not less than a predetermined time period, the clock frequency adjuster adjusts a clock frequency of each of the driving signals and the transferring signals during a transferring period to be lower than a clock frequency of thereof during an exposure period in which exposure is performed for less than the predetermined time period.

According to the imaging apparatus of the present invention with such a structure, when the color imaging device is exposed through a long time exposure in which exposure is performed for not less than the predetermined time period, the clock frequency adjuster adjusts the clock frequency of the driving signals for driving the color imaging device and the clock frequency of the transferring signals for transferring image signals during transferring period to be lower than the clock frequency of thereof during an exposure period in which exposure is performed for less than the predetermined time period. Therefore, even when exposure is performed for a long time period, due to reduction of the operation cycle, the generation of heat by the amplifier or the like contained in the color imaging device can be suppressed, and the generation of noise can be inhibited.

On the other hand, even if the clock frequency of the transferring signals of the color imaging device is decreased, the prolonged width of the operation time period is very small, so that for a long time exposure in which exposure is performed for a few seconds, the ratio of the substantial prolonged width to the entire exposure time period is almost zero, and the operation speed is not decreased.

Moreover, when the clock frequency of the transferring signals is reduced, the characteristic degradation of AFE. (Analog Front End) resulted from operations of analog circuits at high speed and the interference noise with other circuits can be reduced, so that the image quality can be improved.

An imaging apparatus according to a further aspect of the present invention, comprises: a color imaging device which converts an image of a subject projected through an optical system to color image signals and outputs the color image signals, an image processing unit which processes an image and saves the image, an image signal transferring unit which transfers the color image signals to the image processing unit, a first timing signals generator which generates driving signals for driving the color imaging device and a second timing signals generator which generates transferring signals for transferring by the image signal transferring unit, and a clock frequency adjuster, wherein when the color imaging device is exposed through a long time exposure in which exposure is performed for not less than a predetermined time period, the clock frequency adjuster adjusts each of a clock frequency of the driving signals during the exposure period and a clock frequency of each of the driving signals and the transferring signals during a transferring period to be lower than each of the clock frequency of thereof during an exposure period in which exposure is performed for less than the predetermined time period.

According to the imaging apparatus of the present invention with such a structure, when the color imaging device is exposed through a long time exposure in which exposure is performed for not less than the predetermined time period, the clock frequency adjuster adjusts the clock frequency of the driving signals during the exposure period, and the clock frequency of the driving signals and the clock frequency of the transferring signals for transferring image signals during a transferring period to be lower than each of the clock frequency of thereof during an exposure period in which exposure is performed for less than the predetermined time period. Therefore, even when exposure is performed for a long time period, due to the reduction of the operation cycle, the generation of heat by the amplifier or the like contained in the color imaging device can be suppressed, and the generation of noise can be inhibited.

On the other hand, even if the clock frequency of the transferring signals of the color imaging device is decreased, the prolonged width of the operation time period is very small, so that for a long time exposure in which exposure is performed for a few seconds, the ratio of the substantial prolonged width to the entire exposure time period is almost zero, and the operation speed is not decreased.

Moreover, due to decrease the clock frequency of the transferring signals, the characteristic degradation of AFE resulted from operations of analog circuits at high speed and the interference noise with other circuits can be reduced, and the improvement of image quality can be achieved.

The imaging apparatus according to a still further aspect of the present invention, further comprises an exposure mode selecting unit, which switches an exposure time period in which the image of the subject is projected to the color imaging device between a specified time period and a time period corresponding to a specified brightness, wherein in the state that the exposure mode selecting unit is switched to select the specified time period, the clock frequency is adjusted after not less than the predetermined time period elapsed.

According to the imaging apparatus of the present invention with such a structure, in the case that a photographer specifies an exposure time period, or a brightness corresponding to an exposure time period to the exposure mode selecting unit, if the specified time period or the time period corresponding to the specified brightness is not less than a predetermined time period, the clock frequency adjuster switches the clock frequency after the predetermined time period elapsed, therefore, decrease of response unintended by the photographer (user) is not resulted and high-quality picture can be achieved.

The imaging apparatus according to a still further aspect of the present invention, further comprises an image quality-prioritizing mode selecting unit which selects prioritizing levels of image quality of the image of the subject to be imaged, wherein when the prioritizing level selected by the image quality-prioritizing mode selecting unit is at a relative high level within a range of selectable prioritizing levels, then the clock frequency is adjusted.

According to the imaging apparatus of the present invention with such a structure, the photographer (user) can select the image quality prevail over the response. Even in case of the image quality-prioritizing, by setting that reduce the clock frequency only during the exposure period; the prolongation of the operation time period may be suppressed.

A method for controlling an imaging apparatus according to a still further aspect of the present invention, which imaging apparatus comprises a color imaging device for converting an image of a subject projected through an optical system to color image signals and outputting the color image signals, an image processing unit for processing an image and saving the image, an image signal transferring unit for transferring the color image signals to the image processing unit, and a timing signals generator for generating driving signals for driving the color imaging device, wherein when exposure is performed through projecting the image of the subject for a long time period of not less than a predetermined time period, a clock frequency of the driving signals during the exposure period is adjusted to be lower than a clock frequency of the driving signals in an exposure state in which exposure is performed for less than the predetermined time period.

According to the method for controlling an imaging apparatus of the present invention with such a construction, when the long-time exposure is performed for not less than the predetermined time period, the clock frequency of the driving signals during the exposure period is adjusted to be lower than the clock frequency of the driving signals in the exposure state in which exposure is performed for less than the predetermined time period. Therefore, even when exposure is performed for a long time period, due to reduction of the operation cycle, the generation of heat by the amplifier or the like contained in the color imaging device can be suppressed, and the generation of noise can be inhibited.

On the other hand, even if the clock frequency of driving signals of the color imaging device during the exposure period is reduced, there is absolutely no effect on the subsequent transfer, therefore the operation speed is not decreased.

A method for controlling an imaging apparatus, which imaging apparatus comprises a color imaging device for converting an image of a subject projected through an optical system to color image signals and outputting the color image signals, an image processing unit for processing an image and saving the image, an image signal transferring unit for transferring the color image signals to the image processing unit, a first timing signals generator for generating driving signals for driving the color imaging device, and a second timing signals generator for generating transferring signals for transferring by the image signal transferring unit, wherein when exposure is performed through projecting the image of the subject for a long time period of not less than a predetermined time period, a clock frequency of each of the driving signals and the transferring signals during a transferring period is adjusted to be lower than a clock frequency of thereof in an exposure state in which exposure is performed for less than the predetermined time period.

According to the method for controlling an imaging apparatus of the present invention with such a construction, when the longtime exposure is performed for not less than the predetermined time period, each of the clock frequency of the driving signals for driving imaging device and the clock frequency of the transferring signals for transferring image signals is adjusted to be lower than the clock frequency of thereof in the exposure state in which exposure is performed for less than the predetermined time period. Therefore, even when exposure is performed for a long time period, due to reduction of the operation cycle, the generation of heat by the amplifier or the like contained in the color imaging device can be suppressed, and the generation of noise can be inhibited.

On the other hand, even if the clock frequency of the transferring signals of the color imaging device is decreased, the prolonged width of the operation time period is very small, so that for a long time exposure in which exposure is performed for a few seconds, the ratio of the substantial prolonged width to the entire exposure time period is almost zero, and the operation speed is not decreased.

A method for controlling an imaging apparatus, which imaging apparatus comprises a color imaging device for converting an image of a subject projected through an optical system to color image signals and outputting the color image signals, an image processing unit for processing an image and saving the image, an image signal transferring unit for transferring the color image signals to the image processing unit, a first timing signals generator for generating driving signals for driving the color imaging device, and a second timing signals generator for generating transferring signals for transferring by the image signal transferring unit, wherein when exposure is performed through projecting the image of the subject for a long time period of not less than a predetermined time period, each of a clock frequency of the driving signals during the exposure period and a clock frequency of each of the driving signals and the transferring signals during a transferring period is adjusted to be lower than each of the clock frequency of thereof in an exposure state in which exposure is performed for less than the predetermined time period.

According to the method for controlling an imaging apparatus of the present invention with such a construction, when the long-time exposure is performed for not less than the predetermined time period, each of the clock frequency of the driving signals during the exposure time period and the clock frequency of each of the driving signals and the transferring signals for transferring image signals during a transferring period is adjusted to be lower than each of the clock frequency of thereof in an exposure state in which exposure is performed for less than the predetermined time period. Therefore, even when exposure is performed for a long time period, due to reduction of the operation cycle, the generation of heat by the amplifier or the like contained in the color imaging device can be suppressed, and the generation of noise can be inhibited.

On the other hand, even if the clock frequency of the transferring signals of the color imaging device is decreased, the prolonged width of the operation time period is very small, so that for a long time exposure in which exposure is performed for a few seconds, the ratio of the substantial prolonged width to the entire exposure time period is almost zero, and the operating speed is not decreased.

Moreover, due to reduce the clock frequency of transferring signals, the characteristic degradation of AFE resulted from operations of analog circuits at high speed and the interference noise with other circuits can be reduced, the improvement of image quality can be achieved.

The method for controlling an imaging apparatus according to a still further aspect of the present invention, further comprises: switching an exposure time period in which the image of the subject is projected between a specified time period and a time period corresponding to a specified brightness, wherein in the state that to be switched to select the specified time period or the time period corresponding to the specified brightness, the clock frequency is adjusted after not less than the predetermined time period elapsed.

According to the method for controlling an imaging apparatus of the present invention with such a construction, in the case that the photographer specifies the exposure time period, or a brightness corresponding to the exposure time period, if the specified time period or the time period corresponding to the specified brightness is not less than the predetermined time period, the clock frequency is switched after the predetermined time period elapsed, therefore, decrease in response unintended by the photographer (user) is not resulted and high-quality picture can be achieved.

The method for controlling an imaging apparatus according to a still further aspect of the present invention, comprises selecting prioritizing levels of image quality of the image of the subject to be imaged, wherein when the selected prioritizing level is at a relative high level within a range of selectable prioritizing levels, the clock frequency is adjusted.

According to method for controlling an imaging apparatus of the present invention with such a construction, the photographer (user) can select the image quality prevail over the response. Even in case of the image quality-prioritizing, by setting that reduce the clock frequency only during the exposure period, the prolongation of the operation time period may be suppressed.

A recording medium according to the present invention, wherein said recording medium has a control program recorded therein, said control program being configured to be read into a computer and to executing any one of the imaging control methods according to the present invention.

According to the recording medium of the present invention with such a construction, when the control program is read into the computer and the any one of the imaging control methods according to the present invention is executed, the effects corresponding to that imaging control method of the present invention may be achieved.

Therefore, according to the imaging apparatus, the imaging control method and the recording medium readable by a computer of the present invention, by adjusting the clock frequency of driving signals which are triggers for converting exposed subject images to images signals, and/or the clock frequency of transferring signals for transferring the image signals obtained by conversion, in compliance with the exposure time period, the generation of noise can be restrained without substantively prolonging the entire operation time period including exposure operation and transferring operation.

The objects, features and advantages of the present invention will become readily apparent to those skilled in this art from the following description wherein there are shown and described preferred embodiments of this invention, simply by way of illustration of several modes suited to carry out the invention. As it will be realized, the invention can be embodied in different, obvious and various manners without departing from the scope or the spirit of the invention. Accordingly, the drawings and descriptions will be regarded as illustrative in nature and not as restrictive.

BRIEF DESCRIPTION OF THE DRAWINGS

The invention will be described in connection with the attached drawings, wherein.

DESCRIPTION OF NUMERALS

21 CCD
22 Timing signals generator
27 Oscillator
28 Frequency divider
30 Digital signals processing IC
100 Digital camera

BEST MODE OF CARRYING OUT THE INVENTION

Embodiments of the present invention will be explained with reference to the accompanying drawings below. It should be noted that the present invention is not limited to the embodiments, and various modifications and changes can be made with respect to the embodiments.

Figure 1:
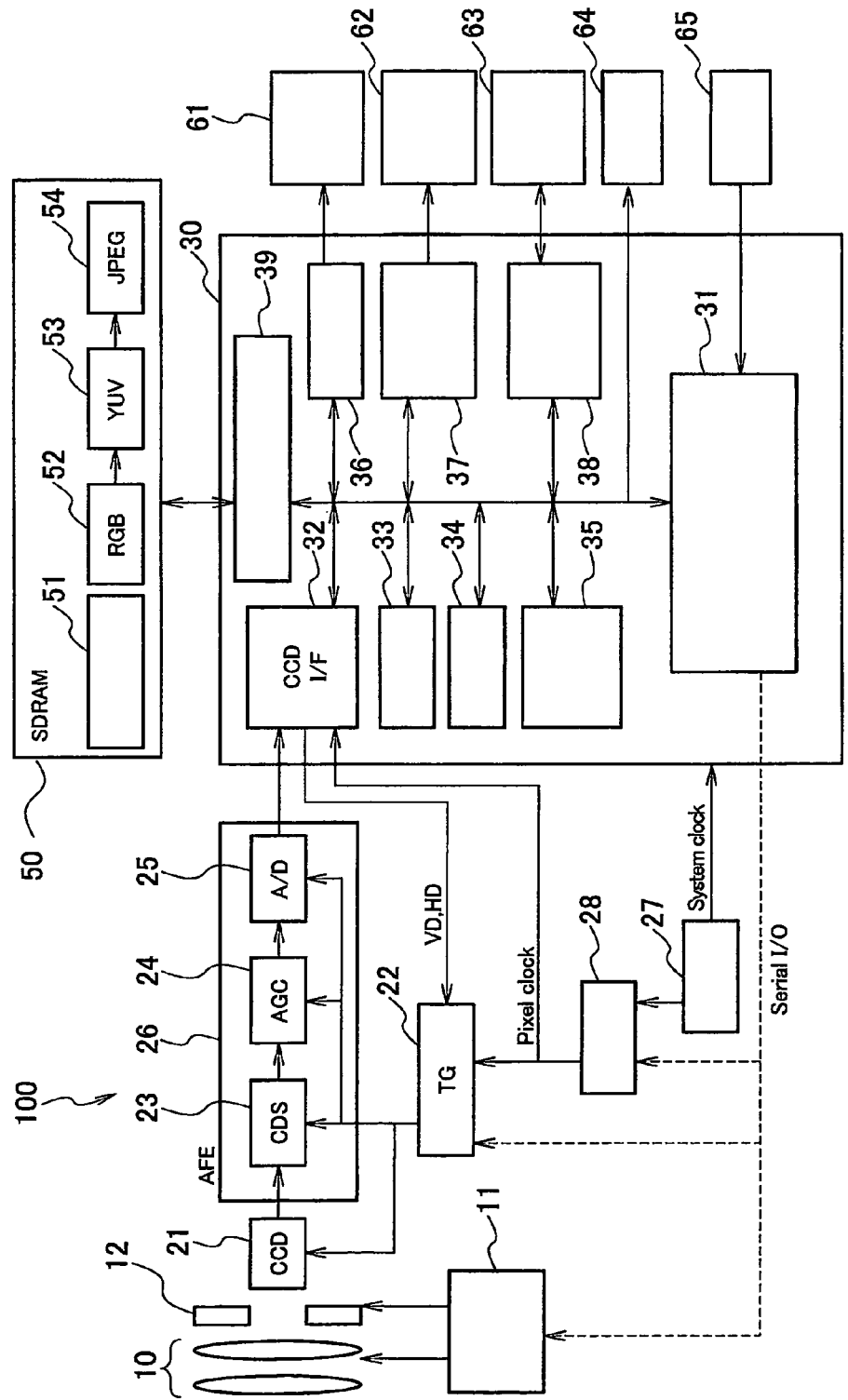
FIG. 1 is a block diagram showing a digital camera as an imaging apparatus according to the present invention.
Figure 2:
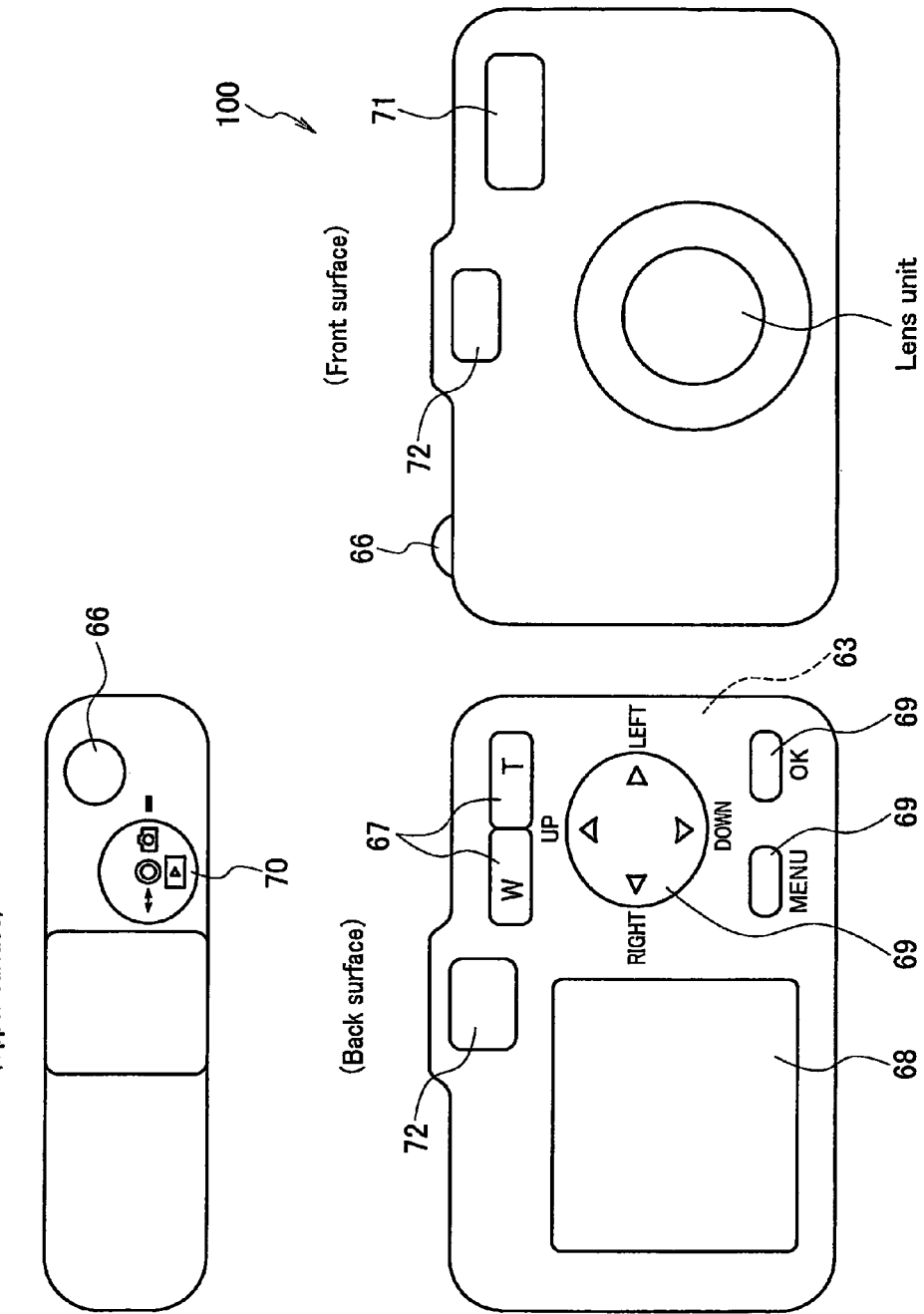
FIG. 2 is an external view of the digital camera shown in FIG. 1.

FIG. 1 is a block diagram showing the digital camera 100 as an imaging apparatus according to the present invention. FIG. 2 is an external view of the digital camera 100 shown in FIG. 1. Referring to FIG. 1, the digital camera 100 comprises: lens unit 10 (optical system) which includes a focus lens and a zoom lens; CCD 21 (color imaging device) which outputs an image of a subject projected through the lenses constructing the lens unit 10 as image signals; a mechanical shutter 12 disposed between the lens unit 10 and CCD 21; a motor driver 11 which displaces at least the focus lens of the lens unit 10 in its movable range; an operating unit 65 which includes a shutter release button 66 (referring to FIG. 2) for receiving a shooting start manipulation; an analog front end (AFE) 26 which mainly performs processing of reading out signals from CCD 21; a digital signals processing IC 30 which performs various computations such as controlling for reading out signals from CCD 21, processing of the signals read out, controlling of drive of the motor driver 11, input processing of operation signals from operating unit 65 or the like; a timing signals generator (TG) 22 which generates driving signals for CCD 21; a frequency divider 28; an oscillator 27 and SDRAM 50 which saves data temporarily, or the like.

In addition, TG 22, the frequency divider 28, the oscillator 27 and the signals processing IC 30 are timing signals generators generating driving signals and transferring signals of CCD 21 and VD signals and HD signals which act as standards for driving signals and transferring signals of CCD, and they are corresponding to clock frequency adjusters as well, and when CCD 21 is exposed through a long time exposure in which exposure is performed for not less than a predetermined time period, the clock frequency adjuster adjusts a clock frequency of the driving signals during the exposure period to be lower than a clock frequency of the driving signals in an exposure state in which exposure is performed for less than the predetermined time period; and adjusts a clock frequency of each of the driving signals and the transferring signals during a transferring period to be lower than a clock frequency of thereof in an exposure state in which exposure is performed for less than the predetermined time period.

The motor driver 11 is controlled by a microcomputer 31 contained inside the signals processing IC 30, and performs drive control for lens as well as open-dose drive control for the shutter 12.

An imaging unit is composed of CCD 21; the timing signals generator 22 which drives CCD 21; CDS 23 which samples image signals according to output data from CCD 21; an analog gain controller (AGC) 24 and A/D converter 25 which converts image of CCD 21 (analog signals) to digital signals. Here, CDS 23, AGC 24 and A/D converter 25 constitute the analog front end (AFE) 26.

In addition, the oscillator 27 supplies system clocks to the signals processing IC 30 which includes microcomputer 31 and the frequency divider 28, respectively. The frequency divider 28 receives the system clock and supplies pixel clock for performing synchronization of the frequency divided pixel corresponding to the instructions from the microcomputer 31, to TG 22 and CCD I/F (interface) unit 32 inside the signals processing IC 30. TG 22 receives the pixel clock and supplies CCD driving signals and transferring signals to CCD 21 and AFE 26.

Digital data input to the signals processing IC 30 from the imaging unit is saved as RGB data 52 temporarily in SDRAM 50 which is a frame memory and as an image storing unit, through CCD I/F unit 32.

The signals processing IC 30 is composed of a CCD IN unit 32; an image processing unit 33; a displaying I/F unit 36; a resize unit 34; a JPEG codec unit 35; a card controller unit 38; a voice codec unit 37; a memory controller 39 and the microcomputer 31 which performs system control.

CCD I/F unit 32 outputs image plane horizontal synchronizing signals (HD) and image plane vertical synchronizing signals (VD), and loads digital RGB signals input from A/D converter 25, coordinate with the synchronizing signals, and writes RGB data 52 to SDRAM 50 through the memory controller 39.

The image processing unit 33 performs conversion of RGB data 52 saved in SDRAM 50 temporarily to YUV data 53, and outputs it to SDRAM 50, according to image processing parameter set by the microcomputer 31.

The resize unit 34 reads out YUV data 53, and performs processes such as size conversion to the necessary size for recording, size conversion to thumbnail images, and size conversion to the other sizes suitable for displaying, etc.

The displaying I/F unit 36 sends data for displaying which is wrote in SDRAM 50, to the displaying device 61 to display shooting images. The displaying device 61 may be displayed on LCD 68 provided in the camera 100, or be output to TV as TV video signals and then be displayed on TV.

JPEG codec unit 35 compresses YUV data 53 wrote in SDRAM 50 and outputs JPEG encoding data 54 which has been JPEG encoded when recording, and expands JPEG encoding data 54 read out from the memory card 63 to YUV data 53 and outputs, when reproducing.

The card controller unit 38 reads out data in the memory card 63 to SDRAM 50, and writes data saved in SDRAM 50 to the memory card 63, according to the instructions from the microcomputer 31.

The microcomputer 31 which is an entire controlling unit, loads a program 51 and control data saved in ROM (not shown) when starting to SDRAM 50, and control the whole apparatus according to the program 51.

The microcomputer 31 performs various imaging controls such as focus control, imaging operation control, setting of image processing parameters in the image processing devices, memory controller and displaying control or the like, according to the instructions input by buttons of the operating unit 65 or the like, the external operating instructions by remote control (not shown) or the like, and the communication operating instructions by communication from external terminals such as personnel computer, etc., or the other instructions.

The operating unit 65 is a unit for the photographer to perform operating instructions to the digital camera 100, it comprises the release button 66 for giving instructions of shooting; a zoom button 67 for setting factors of optical zoom and electronic zoom; a MENU button 69 (exposure mode selecting unit) for making various settings such as selection of the exposure modes and the other settings externally; and a power switch dial 70, etc.

In addition, a flash 71 and an optical finder 72, etc., are provided on a case of the digital camera 100.

Next, functions of the digital camera 100 according to this embodiment will be described with reference to the accompany drawings. The digital camera 100 switches ON in shooting mode when the power switch dial 70 shown in FIG. 2 is turned and set to a "shooting" position (not shown), and lens of the lens unit 10 are moved to a position capable of shooting, a subject image projected to CCD 21 is displayed as a monitoring image on LCD 68 by the function of electric finder.

The zoom lens of the lens unit 10 moves toward a telephoto position when "T" side of the zoom button 67 is pressed in the status of camera ON. While when "W" side of the zoom button 67 is pressed, the zoom lens of the lens unit 10 moves toward a wide-angle position.

Figure 3:
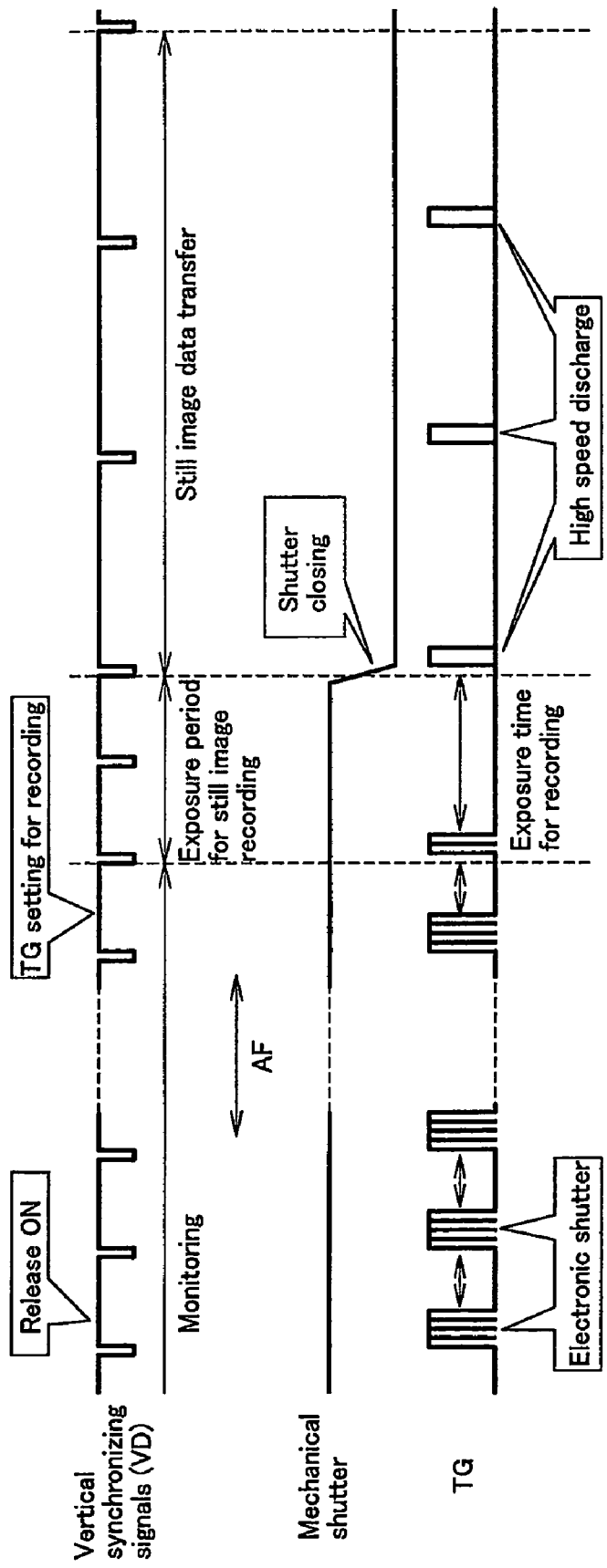
FIG. 3 is a timing chart showing imaging operation of still image recording.

FIG. 3 is a timing chart showing imaging operation of still image recording. When the release button 66 is pressed, the focus lens is moved according to the command from the microcomputer 31, and focusing operation such as CCD-AF which is AF operation of contrast estimating method is carried out, for example, and then shooting preparation processing such as setting exposure time period to TG 22 or the like is performed, and after that recording exposure processing is performed.

After the exposure time period elapsed, the motor driver 11 shut the mechanical shutter 12 according to a command from the microcomputer 31, and the exposure period ended. After that, RGB data of all pixels of CCD 21 are once loaded in SDRAM 50.

Figure 4:
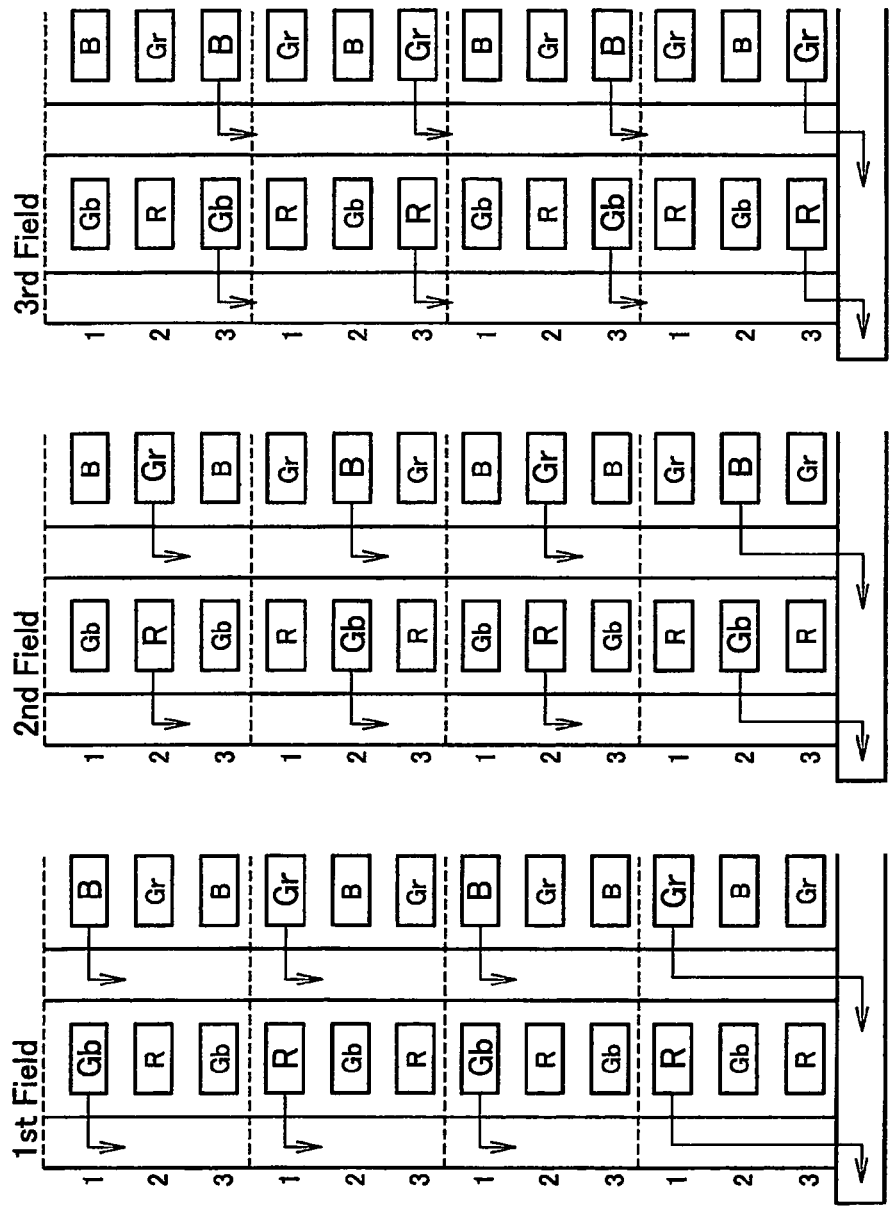
FIG. 4 is a view showing a frame format of transferring of a still image.
Figure 5:
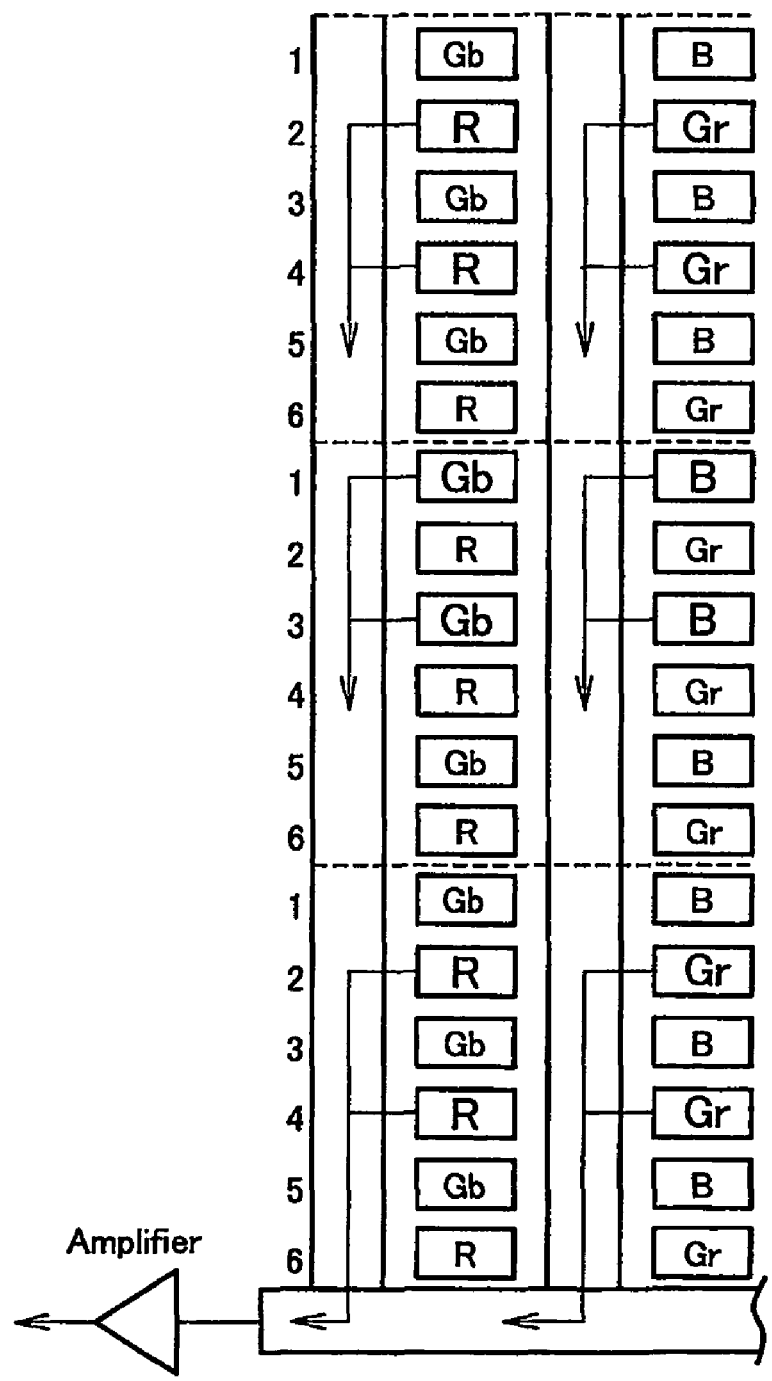
FIG. 5 is a view showing a frame format of transferring of an image for monitoring.

A monitoring image displayed on LCD 68 is read out with pixels thinned out to ⅙ in the vertical direction, as shown in FIG. 5. On the contrary, as shown in FIG. 4, for transferring a still image, a frame is divided into three fields in the vertical direction, and the frame is transferred by transferring each of the three fields one time separately and successively, totally three times due to three fields. So it takes about 0.2 second which is nearly 6 times of that for monitoring image Here, the period of vertical synchronizing signals (VD) at monitoring is 1/30 second, so the exposure time period in the timing chart is about 1/20 second.

RGB (RAW) data 52 loaded in SDRAM 50 is sent to the image processing unit 33 of the signals processing IC 30, and is converted to YUV data 53 therein. After YUV data 53 being converted to the size coordinated with recording pixels in the resize unit 34, JPEG codec unit 35 performs coding processing, and then the data is added header information and saved as JPEG files in the memory card 63.

Figure 7:
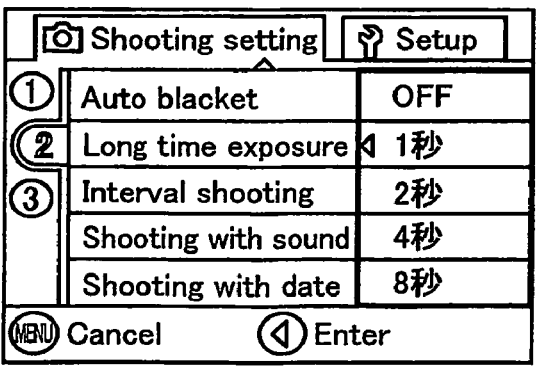
FIG. 7 is a view showing a frame format of another example of menu displaying on LCD.

Next, a case with long time exposure such as when stars in the night sky are shot or the like will be described. FIG. 7 is a menu screen displayed on LCD 68, for selecting imaging control operation of long time exposure.

Figure 6A:
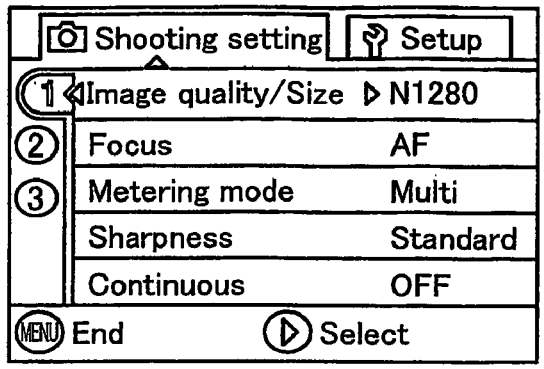
FIGS. 6A, 6B, 6C are views showing a frame format of an example of menu displaying on LCD.
Figure 6B:
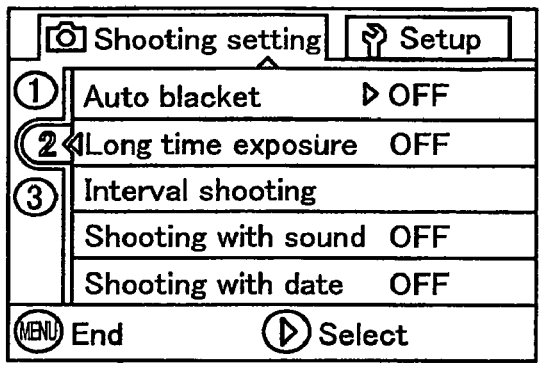
Figure 6C:
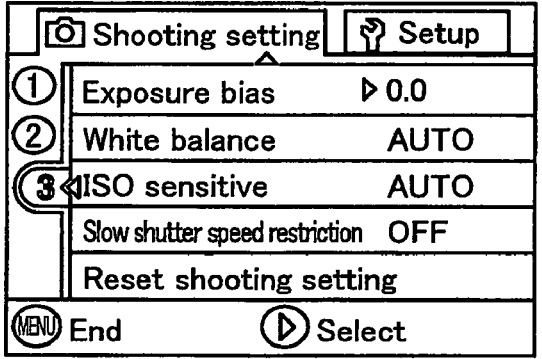

When press the menu button 69 shown in FIG. 2, first, a menu screen of shooting setting as shown in FIG. 6A is displayed. When press the menu button 69 on DOWN side, the menu screen displays the second page as shown in FIG. 6 B, and hold down the menu button 69 additionally on DOWN side, the third page as shown in FIG. 6C is displayed, and hold down the menu button 69 additionally on DOWN side, the menu screen will turn back to the first page as shown in FIG. 6 A. On the other hand, when press the menu button 69 on UP side, the menu screen changes in such an order as shown in FIGS. 6 A, 6 C, 6 B and 6 A.

Then, by the operation of pressing down the menu button 69 on DOWN side or on UP side, the selecting menu of "long time exposure" (referring to FIG. 6 B) is displayed, and a selection from 1, 2, 4, 8, 30, 60, 120 seconds of exposure time period in the case of a long time exposure, or a selection of OFF in which case the long time exposure is not performed, is made from the popup menu.

Here, if OFF is selected, automatic exposure (AE) control works, and an exposure time period corresponding to the brightness of a subject is set automatically. On the other hand, when an exposure time period (any one of 1, 2, 4, 8, 30, 60, 120 seconds) other than OFF is selected, a long time exposure is performed for a time period corresponding to the selected value only.

Figure 8:
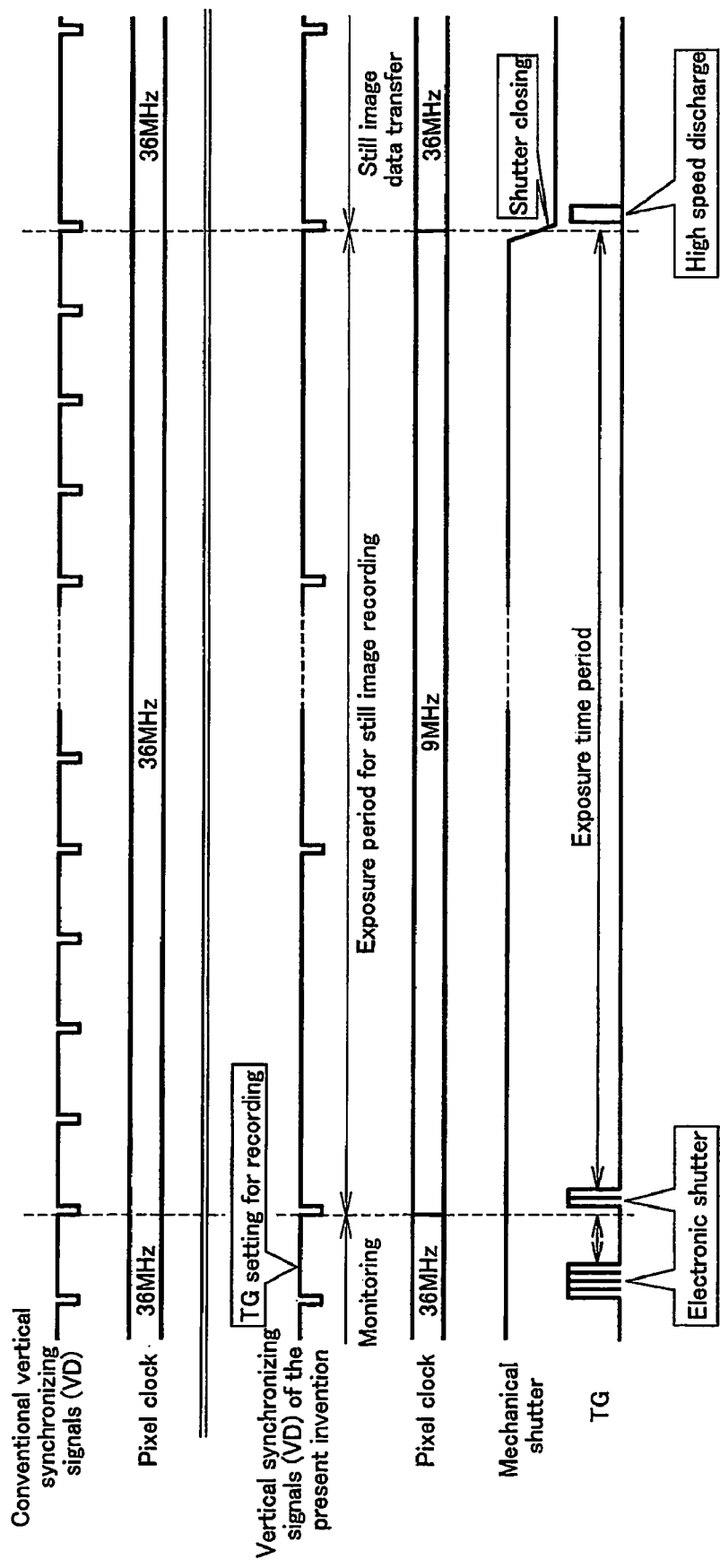
FIG. 8 is a timing chart of exposure operation in which the camera shown in FIG. 1 is exposed for a long time.

Next, changes of operation clock in the case that a long time exposure is performed will be described. FIG. 8 is a timing chart of exposure operation at the long time exposure. In the conventional system, during an exposure period, pixel clock signals and VD signals having the same frequency (for example 36 MHz) with that during a monitoring period are supplied to AFE 26 and CCD 21, while in the present embodiment, only during the exposure period, pixel clock with ¼ frequency of the normal pixel clock (for example 36 MHz) (for example 9 MHz) is supplied to TG 22 by the frequency divider 28.

In CCD I/F 32 of the signals processing IC 30, VD signals and HD signals are generated according to pixel clocks, and a period of VD signals is set depending on the numbers of pixel clock, and a period of VD signals is set depending on HD numbers (horizontal line numbers), so that when the frequency of pixel clock are changed to ¼ of the original frequency, the periods of VD signals and HD signals change automatically to 4 times of the original periods respectively.

And then, when the exposure period is ended, the frequency of the pixel clock is recovered to the original frequency, i.e. 36 MHz, and still image transferring is performed.

Like this, during the exposure period for still images, CCD 21, AFE 26 and TG 22 perform operations for monitoring, while not read out data that accumulated in each pixel, but continue to accumulating operation until the predetermined exposure time period has elapsed.

Consequently, in the pixels where image signals are read out by monitoring operation shown in FIG. 5 per each VD signal, there is a problem that noise generates due to operations of the vertical CCD driving pulses or the like, and although the noise is small per one reading out, when the exposure time period is longer, the number of times at which noise mixed into the image signals increases, and therefore the noise becomes obvious.

Here, compare the numbers of VD signals of the present invention with those of the conventional one shown in the upper side in FIG. 8, the numbers of VD signals become to be ¼ of those of the conventional method. For example, in the case that 1 min is set to be the exposure time period, in the conventional system (the frequency of pixel clock is 36 MHz, and the period of VD signals is 1/30 second) VD signals are output for 1800 times. While in the present embodiment (the frequency of pixel clock is 9 MHz, and the period of VD signals is 1/7.5 second), VD signals are output for 450 times, so the frequency of occurrence of signals for driving CCD 21 (driving signals) decreased greatly, and even noise resulting from the driving signals generated, the frequency of occurrence is quite low, so that it is possible to improve the image quality.

Furthermore, due to the period of driving signals for CCD 21 is prolonged, the number of times of driving is decreased, so that the generation of heat can be suppressed. Especially, CCD 21 or CMOS of imaging devices such as the digital camera 100 or the like, is affected by temperature strongly, therefore, due to suppress the increasing of temperature, it is possible to prevent the degradation of the image quality.

For example, as shown in FIG. 5, the amplifier disposed at the output end of the horizontal transfer line of CCD 21 is operated by the clock frequency of driving signals for CCD 21, and heat is generated. When the amplifier, for example, is disposed at a portion corresponding to upper left portion of a shooting screen, due to the heat generated, only on the upper left portion of the screen the saved charge level becomes high, and high-brightness area near upper left of the screen is broadened, and only that area becomes to an image as if envelope in fog.

However, in the digital camera 100 of the present embodiment, since the frequency of driving signals is a low frequency, the clock numbers supplied to the amplifier during the exposure period descent, and heating value is able to be reduced. As a result, the degradation of the image quality resulting from heat may be suppressed, as mentioned above.

In addition, it is possible to restrict the frequency of the pixel clock by the numbers of VD signals. In other words, for example, in the case that 500-time is set as a limit, the frequency of the pixel clock is 9 MHz in the case that the exposure is performed until 1 min, and the frequency is 4.5 MHz in the case that the exposure is performed for 2-min.

Next, the operation of making the pixel clock at transferring to be a low frequency will be described. For CCD, due to high-quality picture, reading out data increases extremely. While, speeding up of the entire operation speed is desirable.

Consequently, AFE 26 works at high speed too. Due to temperature variations generated by the operation at high speed, etc., characteristics of AFE 26 which deals with data of analog amplitude may be degraded.

Furthermore, the operation at high speed may cause interference with other circuits. For example, in the case that there is interference with the system bus-line, it may be occurred that an image of a subject is output as a banded image due to interference noise, while in the digital camera 100 of the present embodiment, at the long time exposure, the clock frequency of transferring signals for transferring still image data is adjusted to be a low frequency lower than the clock frequency other than at exposure.

Figure 9:
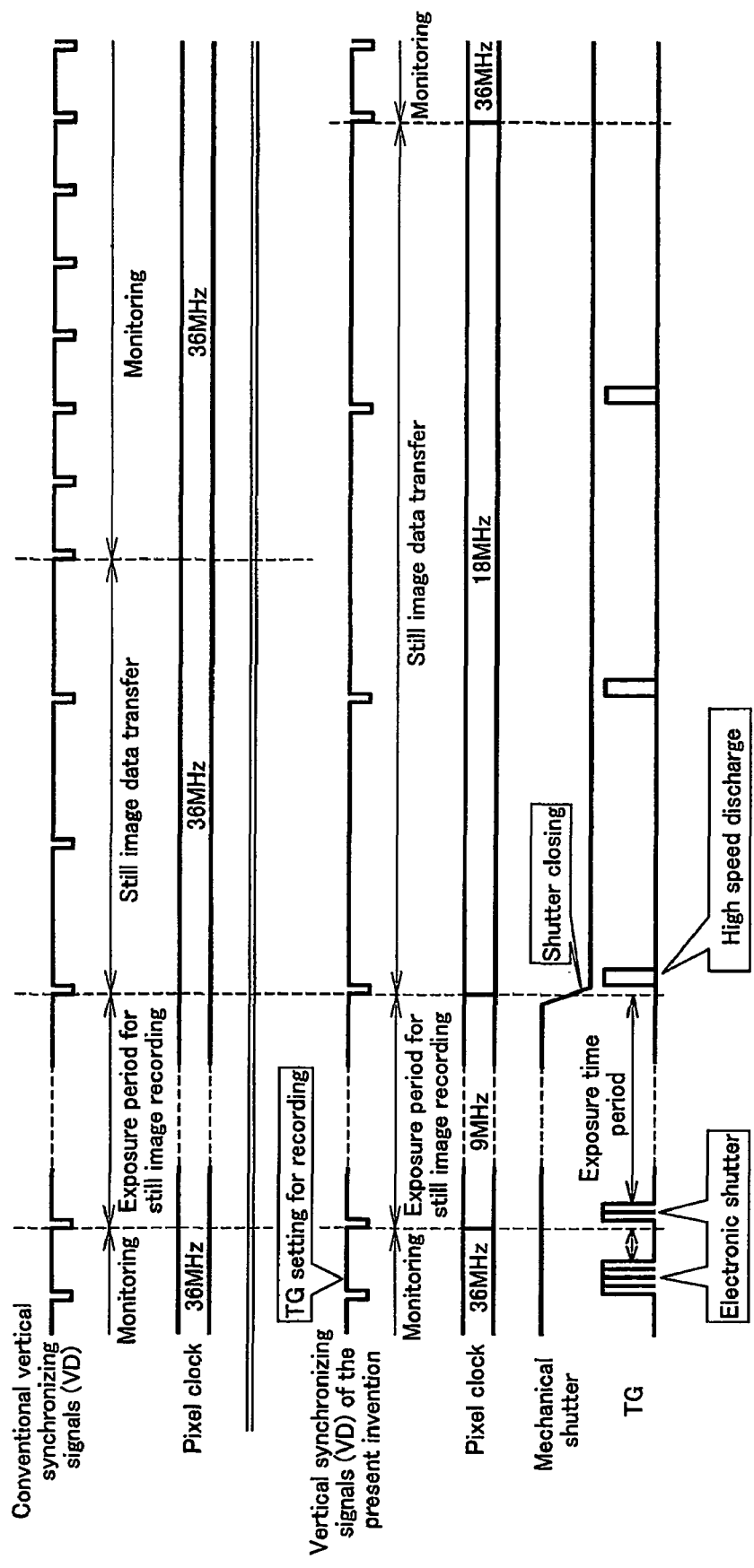
FIG. 9 is a timing chart when a clock frequency of transferring signals at exposure is reduced to ½ of a clock frequency of transferring signals other than at exposure.

FIG. 9 is a timing chart showing that when a pixel clock frequency of transferring signals is reduced to ½ of that in the normal operation such as monitoring or the like, as well as a pixel clock frequency during the exposure period is reduced. In addition, in the example shown in FIG. 9, the clock frequency during the transferring period is reduced to ½, so that it takes twice time for transferring image data, compared with the conventional system.

In other words, when the clock frequency is 36 MHz, it takes 0.2 second for transferring, whereas in the case that the clock frequency is ½ of that, i.e. 18 MHz, it takes 0.4 second for transferring.

Here, for the following two reasons, the digital camera 100 of the present embodiment switches transferring speed only when the long time exposure is set.

In other words, the first reason is to inhibit decrease in operation speed. After setting long time exposure to be OFF, in the case that AE is operated, there is a high possibility to repeat the shooting operation by short cycle.

While on the other hand, in the case that the exposure is set to be long time exposure with intension, there is a low possibility to repeat the shooting operation by short cycle, it is set that lower the clock frequency of transferring signals only when the setting of long time exposure is done.

Furthermore, since the exposure time period of the long time exposure is long, in fact, a ratio of difference of transferring time (0.2 second in the above embodiment) accounting for a total shooting cycle of a shooting entire lowers, accordingly, total response decrease resulted from decrease of transferring time period can be omitted substantively.

The second reason is to inhibit decrease in S/N ratio. In addition, in normal shooting, it is in an exposure state that no need a long time exposure, so values of image signals become to be rather big values. Therefore, degradation of characteristics of AFE 26, or interference noise is not easy to be discovered.

However, in the case that a long time exposure is performed for shooting a dark place purposely, there is a high possibility that values of image signals are small, and degradation of characteristics of AFE 26, or interference noise is likely noticeable. Therefore, only in the case that the long time exposure is set, it is switched to the mode mentioned above.

As mentioned above, by adjusting the clock frequency of transferring signals to be low only at the long time exposure in which exposure is performed for not less than the predetermined time period, it is possible to improve image quality without resulting substantive response decrease.

Moreover, power-saving effect may be obtained by making the clock frequency of transferring signals to be a low frequency. In other words, at still image transferring, a high-speed transferring (high-speed discharge) operation for disposing unnecessary charges accumulated in the transferring line is performed. Since the operation is a high-speed operation, a great electric power is necessary. To retain the dosing state absolutely for a certain period after the mechanical shutter 12 being dosed, a hold voltage is energized to the motor driver 11 which is for operating control for the mechanical shutter 12. And in the case that power consumption by energizing the hold voltage and power consumption for high-speed discharge operation occur simultaneously, a peak of power consumption of the whole system may be resulted.

However, in the digital camera 100 of the present embodiment, in such situation mentioned above, the clock frequency of transferring signals is adjusted to be low, the peak power consumption can be restrained, and power-saving can be ensured.

Therefore, for example, in the case that a long time exposure of 5 min is performed, the power consumption of a conventional digital camera during the long time exposure is great, and after that there is a fear of causing a system down, while during the long time exposure, the power consumption of the digital camera 100 of the present embodiment is low, so that there is no fear of causing a system down.

Furthermore, since the clock frequency of transferring signals can be adjusted, it is possible to provide a shooting menu by which image quality-prioritizing mode and speed priority mode can be selected, and in the image quality-prioritizing mode the clock frequency of transferring signals is adjusted to be responsive to a low frequency, while in the speed priority mode the clock frequency of transferring signals is adjusted to be responsive to a normal frequency (a frequency in the case that not be adjusted to be low) respectively, so that even in the normal shooting operation, it is still a camera that has the valuable effects such as abundance of shooting menu, increasing of selectable items as well.

Moreover, in the case that the digital camera 100 has the continuous shooting function, it is possible to employ a normal clock frequency or a frequency higher than the normal one to achieve high-speed operation at continuous shooting, and switch the clock frequency to a low frequency other than the continuous shooting.

Figure 10:
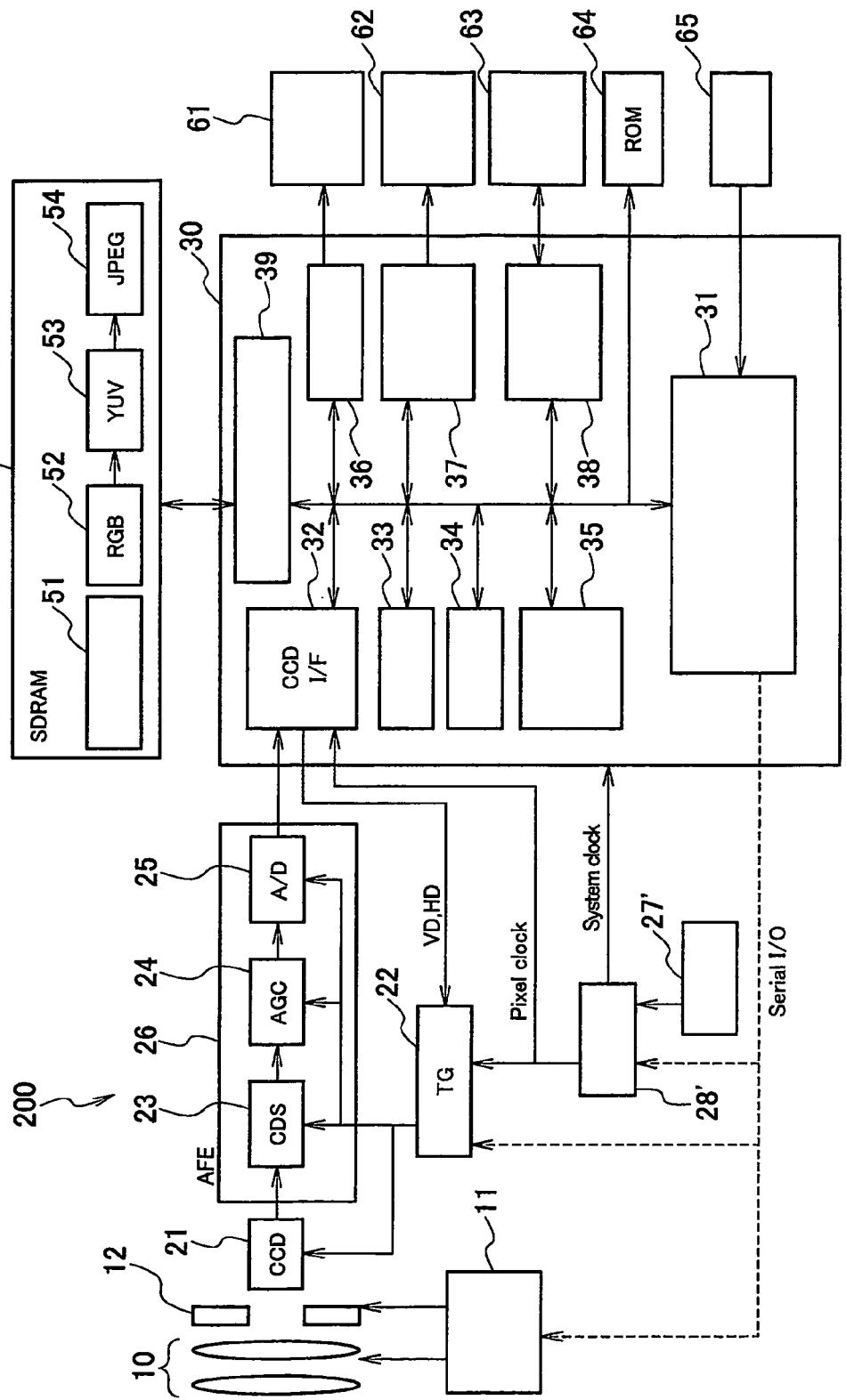
FIG. 10 is a block view showing constitutions of a digital camera according to another embodiment of the present invention.

In addition, due to decrease the clock frequency of transferring signals as well as the clock frequency of the system (clock frequency of operating signals), it is possible to improve the image quality. In other words, the digital camera 200 shown in FIG. 10 is an embodiment in which the block view of the digital camera 100 of FIG. 1 is modified as shown in FIG. 10. In this digital camera 200, the clock supplying source of operating signals to the system (signals processing IC 30, etc.) is changed to the frequency divider 28' (corresponding to the frequency divider 28 in FIG. 1), not the oscillator 27' (corresponding to the oscillator 27 shown in FIG. 1).

According to the digital camera 200 of the embodiment shown in FIG. 10, due to decrease the system clock frequency at still image transferring, it is possible to lower the clock frequency of the bus-line or the like, so that interference noise may be reduced, in addition the power-saving effect is also demonstrated.

Figure 11:
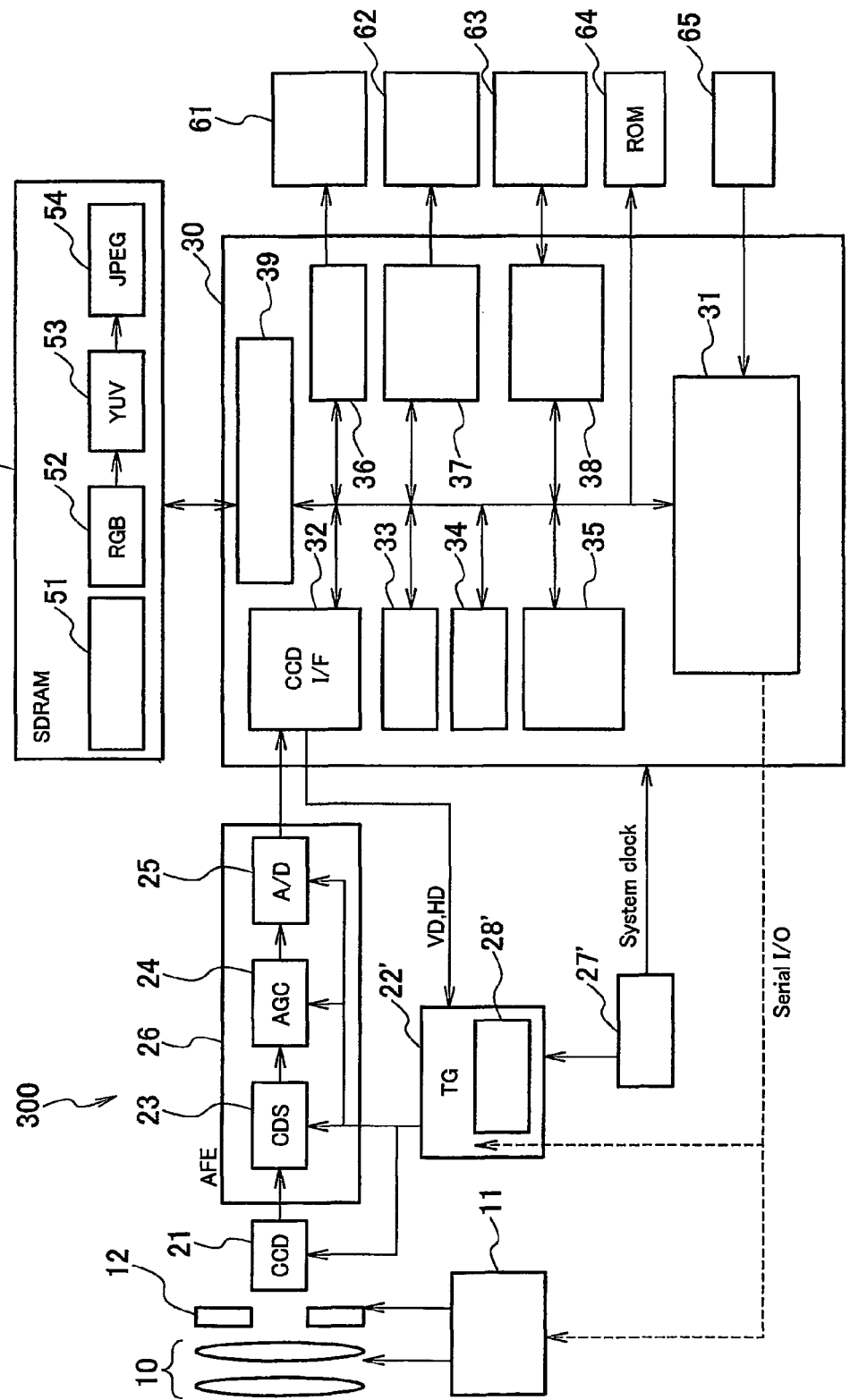
FIG. 11 is a block view showing constitutions of a digital camera according to another embodiment of the present invention.

Furthermore, besides the structures mentioned above, by a digital camera 300 of an embodiment shown in FIG. 11, for example, which has a frequency divider 28' contained inside TG 22' (corresponding to TG 22 shown in FIG. 1), same effects as the digital cameras 100, 200 of each embodiment described above are able to be achieved. However, according to the digital camera 300 of the embodiment, pixel clock is generated by system clock, so that it is necessary to adjust periods of VD signals and ED signals from the signals processing IC 30, when the frequency of pixel clock is verified and operated.

Figure 12:
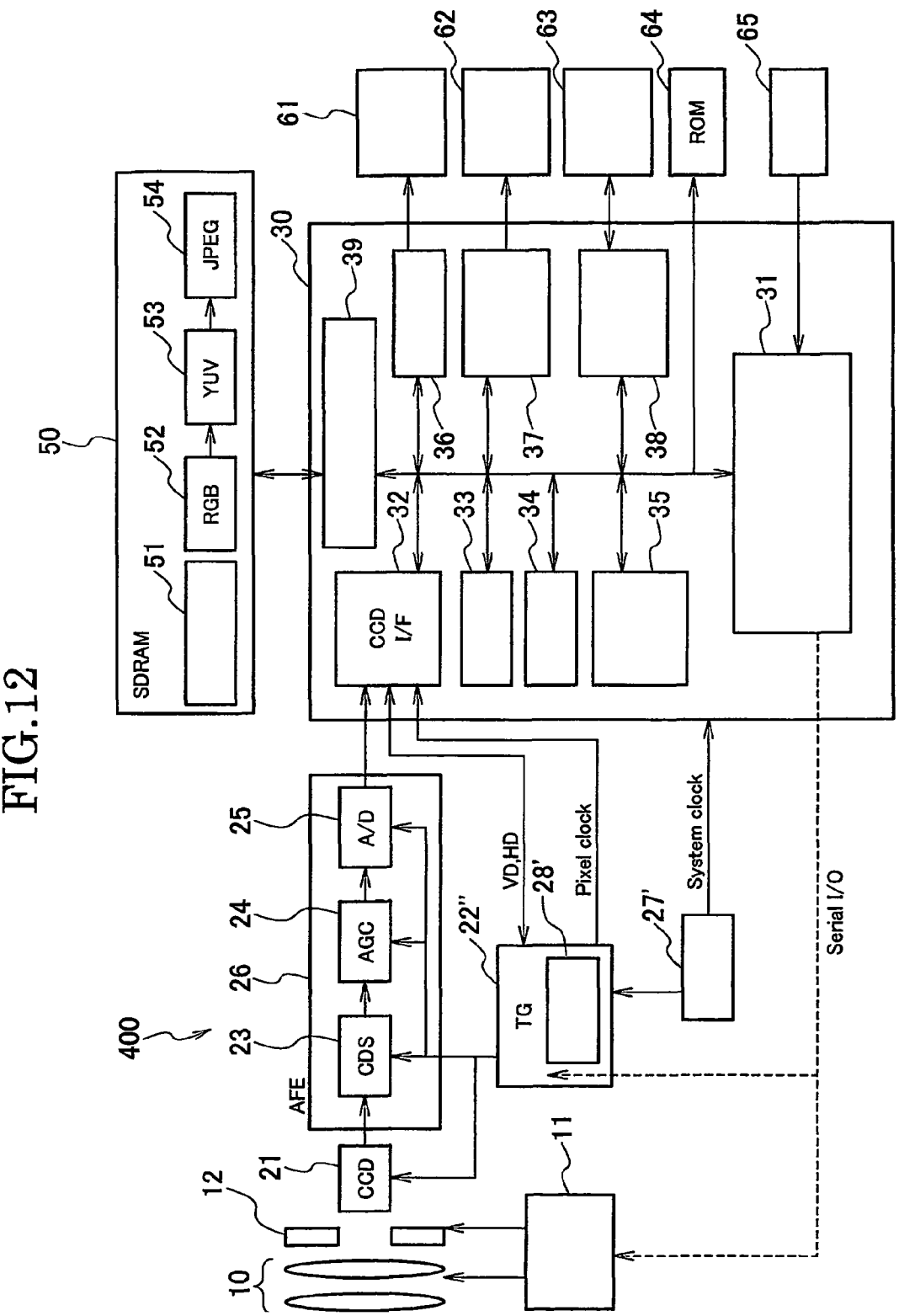
FIG. 12 is a block view showing constitutions of a digital camera according to another embodiment of the present invention.

Moreover, by a digital camera 400 of an embodiment shown in FIG. 12, same effects as the digital cameras 100, 200, 300 of each embodiment described above are able to be achieved. In other words, differences between the digital camera 400 and each of the embodiments mentioned above are that the former receives VD signals, HD signals and pixel clock from TG 22" (corresponding to TG 22 shown in FIG. 1). In the digital camera 400, CCD I/F 32 is operated depending on clock and synchronizing signals incoming, as slave of TG 22".

In addition, a control program for carrying out at least either one of imaging control methods is recorded in the recording medium. The imaging control methods mentioned above include adjusting control of the clock frequency of driving signals for CCD 21, and adjusting control of the clock frequency of transferring signals for reading out signals from CCD 21 of the digital cameras 100, 200, 300, 400 of each embodiments described in the specification. When the control program is read into a computer, the recording medium that achieves the operations cooperated with each of hardware of the computer, may be an embodiment of the recording medium according to the present invention, which has a control program readable by a computer recorded therein.

INDUSTRIAL APPLICABILITY

The imaging apparatus, imaging control method and recording medium according to the present invention are applicable to a digital camera, a digital video camera, or the like.

The invention claimed is:

1. An imaging apparatus, comprising:
a color imaging device which converts an image of a subject projected through an optical system to color image signals and outputs the color image signals;
an image processing unit which processes an image and saves the image;
an image signal transferring unit which transfers the color image signals to the image processing unit;
a timing signals generator which generates driving signals for driving the color imaging device; and
a clock frequency adjuster, wherein, when the color imaging device is exposed during a long time exposure period not less than a predetermined time period, the clock frequency adjuster adjusts a clock frequency of the driving signals during the long time exposure period to be lower than a clock frequency of the driving signals during an exposure period less than the predetermined time period, the apparatus further comprising
an exposure mode selecting unit, which switches an exposure time period during which the image of the subject is projected to the color imaging device, between a specified time period and a time period corresponding to a specified brightness, wherein
when the exposure mode selecting unit switches to select the specified time period or the time period corresponding to the specified brightness, the clock frequency adjuster adjusts the clock frequency after not less than the predetermined time period elapsed.

2. An imaging apparatus, comprising:
a color imaging device which converts an image of a subject projected through an optical system to color image signals and outputs the color image signals;
an image processing unit which processes an image and saves the image;
an image signal transferring unit which transfers the color image signals to the image processing unit;
a timing signals generator which generates driving signals for driving the color imaging device; and
a clock frequency adjuster, wherein, when the color imaging device is exposed during a long time exposure period not less than a predetermined time period, the clock frequency adjuster adjusts a clock frequency of the driving signals during the long time exposure period to be lower than a clock frequency of the driving signals during an exposure period less than the predetermined time period, the apparatus further comprising
an image quality-prioritizing mode selecting unit which selects prioritizing levels of image quality of the image of the subject, wherein,
when the prioritizing level selected by the image quality-prioritizing mode selecting unit is at a relative high level within a range of selectable prioritizing levels, the clock frequency adjuster adjusts the clock frequency.

3. A method for controlling an imaging apparatus, comprising:
converting an image of a subject projected through an optical system to color image signals and outputting the color image signals;
transferring the color image signals to an image processing unit;
processing and saving, by the image processing unit, an image based on the color image signals; and
generating driving signals for converting the image in the converting, wherein, when the converting converts the projected image of the subject during a long time exposure period not less than a predetermined time period, the generating further adjusts a clock frequency of the driving signals during the long time exposure period to be lower than a clock frequency of the driving signals during an exposure period less than the predetermined time period, the method further comprising
switching an exposure time period during which the image of the subject is projected, between a specified time period and a time period corresponding to a specified brightness, wherein
when the switching switches to select the specified time period or the time period corresponding to the specified brightness, the generating driving signals adjusts the clock frequency after not less than the predetermined time period elapsed.

4. A method for controlling an imaging apparatus, comprising:
converting an image of a subject projected through an optical system to color image signals and outputting the color image signals;
transferring the color image signals to an image processing unit;
processing and saving, by the image processing unit, an image based on the color image signals; and
generating driving signals for converting the image in the converting, wherein, when the converting converts the projected image of the subject during a long time exposure period not less than a predetermined time period, the generating further adjusts a clock frequency of the driving signals during the long time exposure period to be lower than a clock frequency of the driving signals during an exposure period less than the predetermined time period, the method further comprising
selecting prioritizing levels of image quality of the image of the subject, wherein,
when a relative high prioritizing level is selected within a range of selectable prioritizing levels in the selecting, the generating driving signals further adjusts the clock frequency.

5. A non-transitory computer readable storage medium storing computer readable instructions thereon that, when executed by an arithmetic processor, directs the arithmetic processor to perform a method for controlling an imaging apparatus according to claim 3.

6. An imaging apparatus, comprising:
a color imaging device which converts an image of a subject projected through an optical system to color image signals and outputs the color image signals;
an image processing unit which processes an image and saves the image;
an image signal transferring unit which transfers the color image signals to the image processing unit;
a first timing signals generator which generates driving signals for driving the color imaging device;
a second timing signals generator which generates transferring signals for transferring the color image signals by the image signal transferring unit; and
a clock frequency adjuster, wherein, when the color imaging device is exposed during a long time exposure period not less than a predetermined time period, the clock frequency adjuster adjusts a clock frequency of each of the driving signals and the transferring signals during a transferring period to be lower than, respectively, a clock frequency of the driving signals and the transferring signals during an exposure period less than the predetermined time period, the apparatus further comprising
an exposure mode selecting unit, which switches an exposure time period during which the image of the subject is projected to the color imaging device, between a specified time period and a time period corresponding to a specified brightness, wherein
when the exposure mode selecting unit switches to select the specified time period or the time period corresponding to the specified brightness, the clock frequency adjuster adjusts the clock frequency after not less than the predetermined time period elapsed.

7. An imaging apparatus, comprising:
a color imaging device which converts an image of a subject projected through an optical system to color image signals and outputs the color image signals;
an image processing unit which processes an image and saves the image;
an image signal transferring unit which transfers the color image signals to the image processing unit;
a first timing signals generator which generates driving signals for driving the color imaging device;
a second timing signals generator which generates transferring signals for transferring the color image signals by the image signal transferring unit; and
a clock frequency adjuster, wherein, when the color imaging device is exposed during a long time exposure period not less than a predetermined time period, the clock frequency adjuster adjusts a clock frequency of the driving signals during the long time exposure period and a transferring period and adjusts a clock frequency of the transferring signals during the transferring period to be lower than, respectively, a clock frequency of the driving signals and the transferring signals during an exposure period less than the predetermined time period, the apparatus further comprising
an exposure mode selecting unit, which switches an exposure time period during which the image of the subject is projected to the color imaging device, between a specified time period and a time period corresponding to a specified brightness, wherein
when the exposure mode selecting unit switches to select the specified time period or the time period corresponding to the specified brightness, the clock frequency adjuster adjusts the clock frequency after not less than the predetermined time period elapsed.

8. An imaging apparatus, comprising:
a color imaging device which converts an image of a subject projected through an optical system to color image signals and outputs the color image signals;
an image processing unit which processes an image and saves the image;
an image signal transferring unit which transfers the color image signals to the image processing unit;
a first timing signals generator which generates driving signals for driving the color imaging device;
a second timing signals generator which generates transferring signals for transferring the color image signals by the image signal transferring unit; and
a clock frequency adjuster, wherein, when the color imaging device is exposed during a long time exposure period not less than a predetermined time period, the clock frequency adjuster adjusts a clock frequency of each of the driving signals and the transferring signals during a transferring period to be lower than, respectively, a clock frequency of the driving signals and the transferring signals during an exposure period less than the predetermined time period, the apparatus further comprising
an image quality-prioritizing mode selecting unit which selects prioritizing levels of image quality of the image of the subject, wherein,
when the prioritizing level selected by the image quality-prioritizing mode selecting unit is at a relative high level within a range of selectable prioritizing levels, the clock frequency adjuster adjusts the clock frequency.

9. An imaging apparatus, comprising:
a color imaging device which converts an image of a subject projected through an optical system to color image signals and outputs the color image signals;
an image processing unit which processes an image and saves the image;
an image signal transferring unit which transfers the color image signals to the image processing unit;
a first timing signals generator which generates driving signals for driving the color imaging device;
a second timing signals generator which generates transferring signals for transferring the color image signals by the image signal transferring unit; and
a clock frequency adjuster, wherein, when the color imaging device is exposed during a long time exposure period not less than a predetermined time period, the clock frequency adjuster adjusts a clock frequency of the driving signals during the long time exposure period and a transferring period and adjusts a clock frequency of the transferring signals during the transferring period to be lower than, respectively, a clock frequency of the driving signals and the transferring signals during an exposure period less than the predetermined time period, the apparatus further comprising
an image quality-prioritizing mode selecting unit which selects prioritizing levels of image quality of the image of the subject, wherein,
when the prioritizing level selected by the image quality-prioritizing mode selecting unit is at a relative high level within a range of selectable prioritizing levels, the clock frequency adjuster adjusts the clock frequency.

10. The imaging apparatus according to claim 1, further comprising an image quality-prioritizing mode selecting unit which selects prioritizing levels of image quality of the image of the subject, wherein, when the prioritizing level selected by the image quality-prioritizing mode selecting unit is at a relative high level within a range of selectable prioritizing levels, the clock frequency adjuster adjusts the clock frequency.

11. A method for controlling an imaging apparatus, comprising:

converting an image of a subject projected through an optical system to color image signals and outputting the color image signals;

transferring the color image signals to an image processing unit;

processing and saving, by the image processing unit, an image based on the color image signals;

generating driving signals for converting the image in the converting; and generating transferring signals for transferring the color image signals in the transferring, wherein, when the converting converts the projected image of the subject during a long time exposure period not less than a predetermined time period, the generating driving signals further adjusts a clock frequency of the driving signals and the generating transferring signals further adjusts a clock frequency of the transferring signals during a transferring period to be lower than, respectively, a clock frequency of the driving signals and a clock frequency of the transferring signals during an exposure period less than the predetermined time period, the method further comprising switching an exposure time period during which the image of the subject is projected, between a specified time period and a time period corresponding to a specified brightness, wherein when the switching switches to select the specified time period or the time period corresponding to the specified brightness, the generating driving signals adjusts the clock frequency after not less than the predetermined time period elapsed.

12. A method for controlling an imaging apparatus, comprising:

converting an image of a subject projected through an optical system to color image signals and outputting the color image signals;

transferring the color image signals to an image processing unit;

processing and saving, by the image processing unit, an image based on the color image signals;

generating driving signals for converting the image in the converting; and generating transferring signals for transferring the color image signals in the transferring, wherein, when the converting converts the projected image of the subject during a long time exposure period not less than a predetermined time period, the generating driving signals further adjusts a clock frequency of the driving signals during the long time exposure period and a transferring period and the generating transferring signals further adjusts a clock frequency of the transferring signals during the transferring period to be lower than, respectively, a clock frequency of the driving signals and a clock frequency of the transferring signals during an exposure period less than the predetermined time period, the method further comprising switching an exposure time period during which the image of the subject is projected, between a specified time period and a time period corresponding to a specified brightness, wherein when the switching switches to select the specified time period or the time period corresponding to the specified brightness, the generating driving signals adjusts the clock frequency after not less than the predetermined time period elapsed.

13. A method for controlling an imaging apparatus, comprising:

converting an image of a subject projected through an optical system to color image signals and outputting the color image signals;

transferring the color image signals to an image processing unit;

processing and saving, by the image processing unit, an image based on the color image signals;

generating driving signals for converting the image in the converting; and generating transferring signals for transferring the color image signals in the transferring, wherein, when the converting converts the projected image of the subject during a long time exposure period not less than a predetermined time period, the generating driving signals further adjusts a clock frequency of the driving signals and the generating transferring signals further adjusts a clock frequency of the transferring signals during a transferring period to be lower than, respectively, a clock frequency of the driving signals and a clock frequency of the transferring signals during an exposure period less than the predetermined time period, the method further comprising selecting prioritizing levels of image quality of the image of the subject, wherein, when a relative high prioritizing level is selected within a range of selectable prioritizing levels in the selecting, the generating driving signals further adjusts the clock frequency.

14. A method for controlling an imaging apparatus, comprising:

converting an image of a subject projected through an optical system to color image signals and outputting the color image signals;

transferring the color image signals to an image processing unit;

processing and saving, by the image processing unit, an image based on the color image signals;

generating driving signals for converting the image in the converting; and generating transferring signals for transferring the color image signals in the transferring, wherein, when the converting converts the projected image of the subject during a long time exposure period not less than a predetermined time period, the generating driving signals further adjusts a clock frequency of the driving signals during the long time exposure period and a transferring period and the generating transferring signals further adjusts a clock frequency of the transferring signals during the transferring period to be lower than, respectively, a clock frequency of the driving signals and a clock frequency of the transferring signals during an exposure period less than the predetermined time period, the method further comprising selecting prioritizing levels of image quality of the image of the subject, wherein, when a relative high prioritizing level is selected within a range of selectable prioritizing levels in the selecting, the generating driving signals further adjusts the clock frequency.

* * * * *